United States Patent [19]

Greenberg

[11] 4,129,671

[45] Dec. 12, 1978

[54] DECORATIVE MIRRORED ARTICLE WITH BEVEL-EFFECT PRODUCING EDGES

[75] Inventor: Ronald C. Greenberg, Bel Air, Calif.

[73] Assignee: t.h.e. Original Mirror Company, Chicago, Ill.

[21] Appl. No.: 801,039

[22] Filed: May 27, 1977

[51] Int. Cl.[2] .................................................. B32B 3/02

[52] U.S. Cl. .................................... 428/48; 272/8 M; D25/80; 428/203; 428/210; 428/49; 428/46; 428/433; 428/192; 428/194; 427/284; 427/280; 427/45; 350/288

[58] Field of Search ............... 428/192, 194, 209, 210, 428/410, 433, 38, 81, 48, 14, 47, 434, 203; 350/288; 156/663, 654; 40/154; 96/38.1, 36.4; 427/280, 284, 287, 267; D6/242, 232; D25/80; 272/8 M, 8.5; 52/311

[56] References Cited

U.S. PATENT DOCUMENTS

| | | | |
|---|---|---|---|
| D. 32,804 | 6/1900 | Clements | D6/241 |
| D. 75,365 | 10/1927 | Hauck | D6/241 |
| 1,345,792 | 7/1920 | McAvoy | 428/66 |
| 2,036,329 | 4/1936 | Giles | 428/194 X |
| 2,162,590 | 6/1939 | Richter et al. | 350/288 |

*Primary Examiner*—George F. Lesmes

*Assistant Examiner*—Alexander S. Thomas

*Attorney, Agent, or Firm*—Wallenstein, Spangenberg, Hattis & Strampel

[57] ABSTRACT

A decorative mirrored tile or the like preferably comprises a square transparent plate of glass or the like of substantially the same thickness throughout including the marginal portions thereof, and a mirror-forming surface at the rear of the plate extending to the margins thereof. There is provided along a band at each margin of the plate innumerable, tiny, spaced light interrupting areas or spots contrasting to the light transmitting characteristics of the tile between the same and the density of which varies progressively in a direction generally parallel to the plate margin involved, reaching maximum and minimum densities respectively at opposite ends thereof where they terminate along respective lines substantially bisecting the angle between the plate edges intersecting the corners of the plate thereat. An appearance of a mitered edge is provided at each corner of the plate by placing the dense end of each of the bands of light interrupting areas or spots along one margin of the plate adjacent to the least dense end of the band of light interrupting areas or spots at the adjacent margin of the plate.

11 Claims, 6 Drawing Figures

DECORATIVE MIRRORED ARTICLE WITH BEVEL-EFFECT PRODUCING EDGES

BACKGROUND OF THE INVENTION

This invention relates to mirrored articles, and while it has application to individual mirrors of all shapes, its most important application is in wall tiles which are most commonly square tiles made from a transparent glass or synthetic plastic plate having a mirror-forming coating applied to the rear thereof. These mirrored tiles are generally decorated in some way so that when a number of such tiles are placed together in rows and columns on a wall they form a decoration for the wall. In some cases, the wall tiles are decorated by applying opaque or translucent ink in various patterns between the mirror-forming coating and the back surface of the transparent plate. In other cases, the margins of each of the mirrored tiles are tapered or bevelled. The present invention relates to mirrored tiles which appear to be bevelled along their margins.

Bevelled mirrored tiles have, heretofore, been very costly because the procedure for tapering the marginal portions of the transparent plates in an expensive one. For example, in some cases, the cost of bevelling the transparent plate of a mirrored tile is up to 0.04 per inch, which means the cost of bevelling the transparent plate of a mirrored tile runs in excess of $1.50 per plate.

An object of the present invention, is to provide a decorative mirrored tile which has what appears to be bevelled edges, but which can be made at a small fraction of the cost of producing bevelled mirrored tiles. Another object of the invention is to provide a decorative mirrored tile even more attractive than the bevelled mirrored tiles heretofore made.

SUMMARY OF THE INVENTION

In accordance with the present invention, a rectangular decorative mirrored tile or other mirrored article is provided which gives the appearance of having bevelled edges even though the transparent plate thereof is substantially the same thickness throughout the same. The means to be described for obtaining this bevelled effect at the margins of the transparent plate do not materially increase the cost of the decorative mirrored tile relative to the un-bevelled decorative mirrored tiles. For example, instead of costing in excess of $1.50 more per mirrored tile to provide a bevelled edge as is the case with conventional bevelled mirrored tiles, the bevel effect is achieved in the present invention at a cost well under $0.10 per mirrored tile. Additionally, as will be explained, very unusual attractive visual effects are achieved with the present invention.

In accordance with one of the features of the present invention, there is provided along a relatively narrow band along each margin of the transparent plate innumerable, tiny, spaced, light interrupting areas or spots contrasting to the light transmitting characteristics of the mirrored tile between the same. While in accordance with the broadest aspects of the present invention, the light interrupting areas can be in the form of lines or other elongated areas, they are preferably in the form of circular or elliptical spots forming a stippled pattern. The width of each light transmitting area or spot is so small, that, for example, they are of the size of the tint or half tone dots commonly used in the printing art, so that the human eye does not discern the individual areas or spots.

The spaced light interrupting areas or spots vary in density or appearance at least at the ends thereof at the corners of the plate where they terminate along lines substantially bisecting the angle between the plate edges intersecting the corners of the plate. At each corner of the plate the contiguous bands of these light interrupting areas or spots are provided with a contrasting density or appearance along the line bisecting the angle thereat to give the appearance of a mitered joint thereat. It is preferable that the density of these spaced light interrupting areas or spots varies progressively generally parallel to the plate margin involved, so that these areas or spots have a maximum density at one end of each band thereof and a minimum density at the other end thereof. If the direction in which the spaced light interrupting areas or spots increase in density along each margin of the plate is the same along each margin of the plate, then the high density terminating end of each band of spaced light interrupting areas or spots will be opposite the minimum density terminating end of the adjacent band of spaced light interrupting areas or spots on the opposite side of said angle bisecting line thereat, to form what appears to be a mitered edge appearance along each of said lines. The most realistic bevelled effect is achieved by varying the density of the spaced light interrupting areas or spots along the margins of the mirrored article in directions both longitudinally and transversely of the margins of the mirrored article.

While it is believed that a bevelled effect can be achieved without doing so, the most impressive and realistic bevel effect is achieved where the mirror-forming surface at the rear of the transparent plate involved extends behind the marginal portions of the plate containing the spaced light interrupting areas or spots, so that the mirror-forming surface reflects light to the front of the plate between the light interrupting areas or spots. Also, while the spaced light interrupting areas or spots may be formed by opaque, translucent or transparent inks applied to the front or rear face of the transparent plate forming the main body of the mirrored article involved, the most effective and impressive bevel effects are achieved by etching the light interrupting areas or spots referred to on the front face of the transparent plate. This especially enhances what appears to be the mitered edge at each corner of a rectangular mirrored article.

Very attractive visual effects are achieved by a proper arrangement of a number of decorative rectangular mirrored tiles as just described. Thus, adjacently mounted rectangular mirrored tiles are oriented in such a way that the relatively dense end of each band of spaced light interrupting areas or spots in a mirrored tile is positioned opposite the least dense end of the band of spaced light interrupting areas or spots of the adjacent tile. This effect is especially pronounced when four such tiles are arranged so that they meet at a common point, to produce a pattern of what appears to be an intersection of four mitered joints at a common meeting point.

The above described objects, advantages and features of the invention will become more apparent upon making reference to the specification to file, the claims and the drawings.

DESCRIPTION OF EXEMPLARY FORMS OF THE INVENTION SHOWN IN THE DRAWINGS

Figure 1:
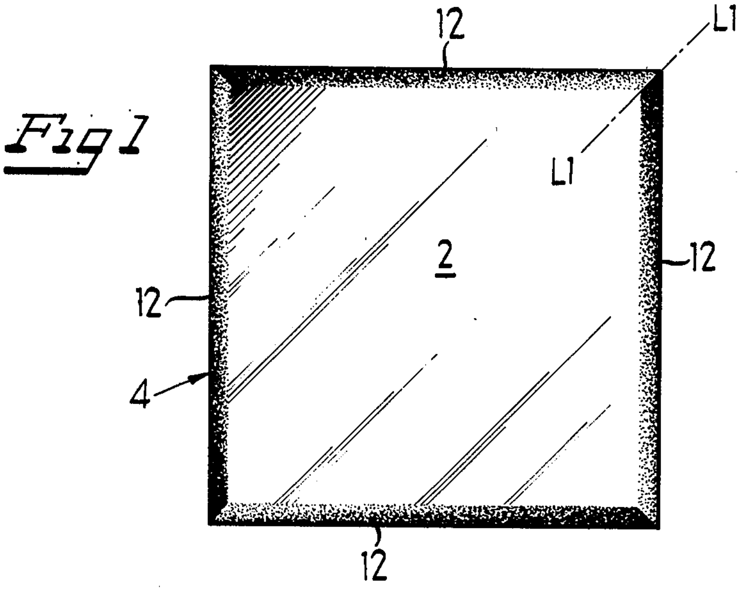
FIG. 1 is a view of a decorative mirrored tile made in accordance with the present invention.
Figure 2:
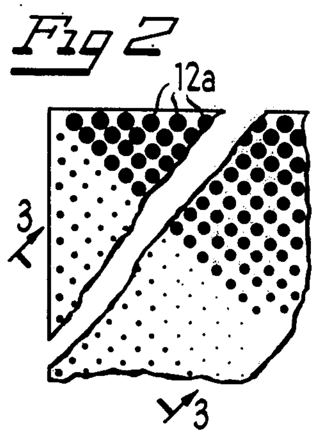
FIG. 2 is a greatly magnified broken-away view at one of the corners of the mirrored tile shown in FIG. 1, and illustrates a stippled pattern of data etched into bands along the marginal portions of the front face of the transparent plate making up the main body of the decorative mirrored tile shown in FIG. 1.
Figure 3:
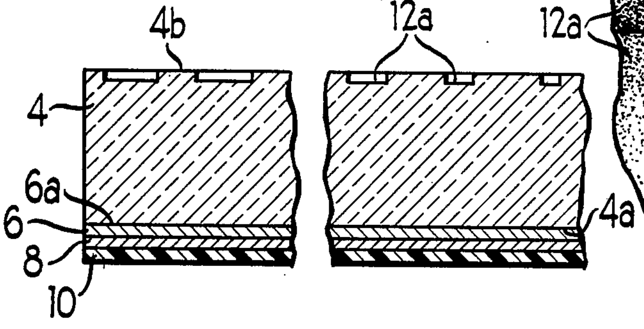
FIG. 3 is a sectional view through FIG. 2, taken along section line 3—3 therein.

Referring now more particularly to FIGS. 1 through 3, where the decorative mirrored tile 2 thereshown comprises a transparent square plate 4, preferably made of glass but which can also be made of a transparent synthetic plastic material resembling glass in its light transmitting qualities. Applied to the rear face 4a of the transparent plate 4 is the usual mirror-forming layer of silver 6 or other similar material which provides a mirror-forming reflecting surface 6a which reflects light directed thereto through the front face 4b of the transparent plate 4. As is more less conventional, the mirror-forming layer 6 may be coated with a layer 8 of copper or the like; the copper layer 8 is, in turn, generally covered by a suitable backing layer 10 which acts as a protection for the silver and copper layers 6 and 8. The layers 6, 8 and 10 preferably extend to the outside edges of the transparent plate 4.

The transparent plate 4 is a substantially constant thickness throughout including the marginal portions thereof, but the marginal portions 12 of the mirrored tile have the appearance of being bevelled because of the unique method of ornamentation or treatment of the mirrored tile. Thus, as previously explained, there is provided along each marginal portion of the transparent plate 4 a bevel effect-producing band 12 formed by the application of innumerable, tiny, spaced, light interrupting areas or spots 12*a* (see FIG. 2). Where spots are utilized as shown, they form a stippled pattern of progressively varying density. Best results are achieved when these spots are circular dots which gradually increase in intensity towards the centers thereof, to form a half tone rather than a tint tone stippled pattern of such dots. In the most preferred form of the invention, the mirror-forming surface 6*a* extends to the very edges of the transparent 4. The plate between the light interrupting areas or spots 12*a* is preferably transparent so that light passing unhindered therethrough from the front of the plate is reflected back by the mirror-forming surface 6*a* into the spaces between the light interrupting areas or spots 12*a*. While the areas or spots 12*a* may be formed by opaque, translucent of transparent inks applied to the front or rear face of the plate, the most impressive bevel effect-producing results are achieved when these bands of light interrupting areas or spots 12*a* are etched into the transparent plate 4, preferably on the front face 4*b* thereof.

Particularly in the case where the decorative mirrored tile is a rectangular tile having straight edges intersecting at corners of the tile, the bevel effect is achieved by varying the density of each band 12 of spaced, light interrupting areas or spots 12*a* in the direction of the adjacent margin of the plate so that the areas or spots 12*a* reach a maximum density at one end of the band 12 and a minimum density at the opposite end thereof. Each band of light interrupting areas or spots 12*a* terminates at each end thereof along preferably an imaginary line like L1—L1 substantially bisecting the angle between the plate edges intersecting at the corner of the plate thereat. Moreover, as shown in FIG. 1, the density of each band of light interrupting areas or spots decreases in a clockwise direction around the margins of the mirrored tile so that the high density terminating end of each band of spaced light interrupting areas or spots 12*a* is opposite the minimum density terminating end of the adjacent band of spaced light interrupting areas or spots 12*a* on the opposite side of the angle bisecting line thereat, so as to form what appears to be a mitered edge at each corner of the mirrored tile 2.

The density of the light interrupting areas or spots 12*a* varies also in a direction transversely to the adjacent margin of the mirrored tile. As shown, the density of the light interrupting areas or spots 12*a* preferably decreases towards the inner margin of this band.

Figure 5:
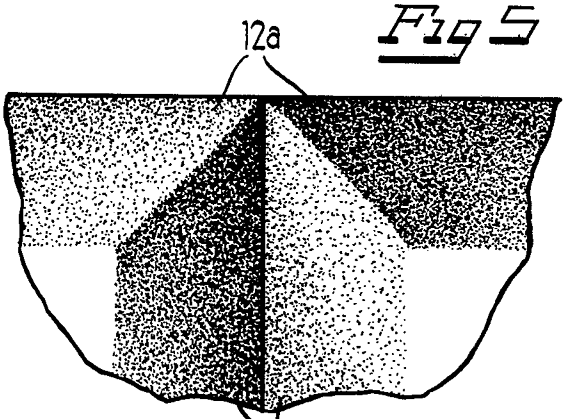
FIG. 5 is a greatly enlarged view of the point of intersection between the two uppermost tiles of FIG. 4.
Figure 6:
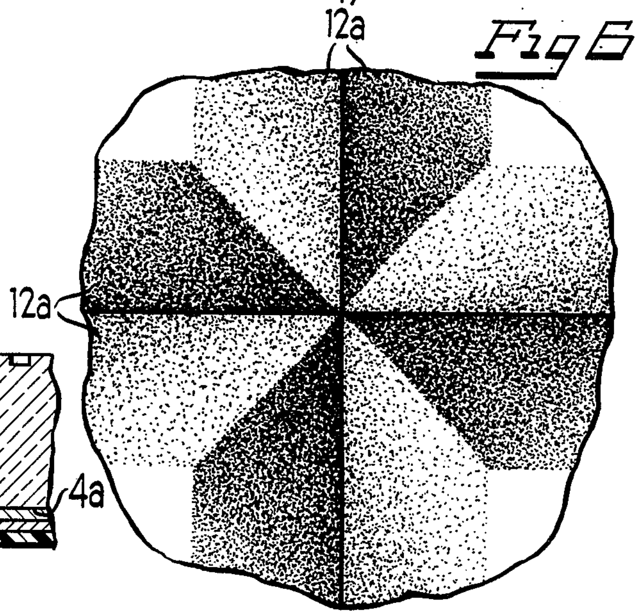
FIG. 6 is a greatly enlarged view showing the common point of intersection of the four tiles shown in FIG. 4.
Figure 4:
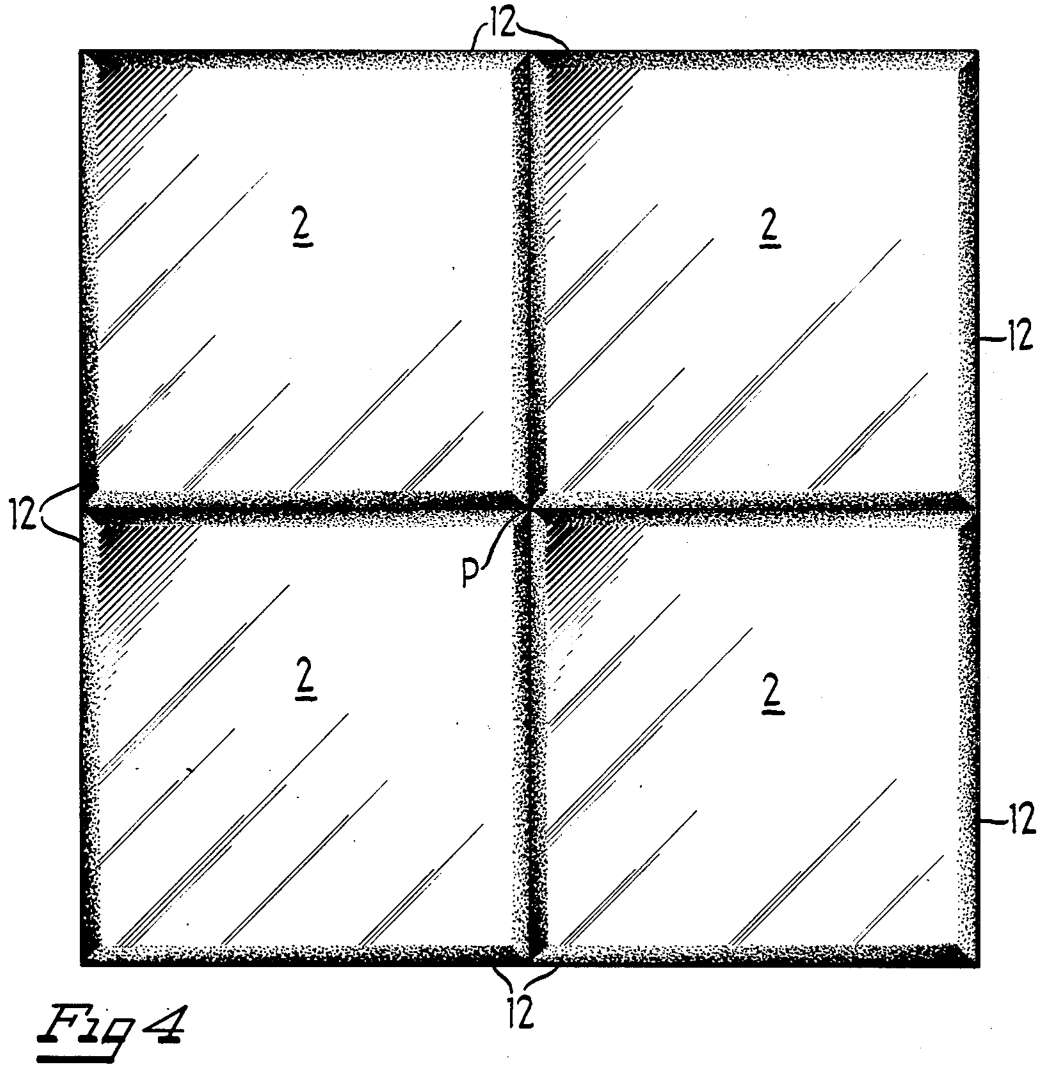
FIG. 4 is a view showing four decorative mirrored tiles like that shown in FIG. 1, assembled so that they meet at a common central point so that the bands of marginal etched data complement of reinforce one another.

Refer now to FIGS. 4 through 6 which illustrates the attractive effects which are produced when a number of mirrored tiles 2 are mounted together in abutting relation such as where four such tiles are mounted to encompass a square area where they join at a common central point P, and where the tiles are oriented so that the high density terminating end of each band of light interrupting areas or spots of of each tile is opposite the low density terminating end of the band of light interrupting areas or spots of the adjacent tile. This provides the especially attractive intersecting mitered edge-appearing pattern at the common point P of the four tiles, as shown in FIG. 4, and at the point where only two tiles come together, as shown in FIG. 5.

The light interrupting areas or spots may be etched into the front face of the transparent plates in any one of a number of ways. For example, a suitable glass etchant may be applied to the marginal portions of the plates through a silk screen having tiny apertures corresponding to the preferably half tone dots forming the desired stippled pattern thereof as shown in the drawings. The silk screen can be made by directing light through a positive film having the desired half tone pattern of dots thereon upon a silk screen having the usual photosensitive coating thereon and with the emulsion side of the film preferably placed against the photosensitive coating of the silk screen. The silk screen is completed by applying a chemical to the exposed photosensitive coating thereon which removes only the unexposed stippled dot pattern forming portions of the photosensitive coating.

The present invention uniquely provides mirrored articles including a transparent plate of substantially even thickness throughout and which appears to have a bevelled edge along the entire border thereof. As previously indicated, the cost of manufacture of such a bevelled edge appearing mirrored article costs only a fraction of that required to construct a mirrored article with actual bevelled edges thereon.

It should be understood that numerous modifications may be made in the most preferred forms of the invention illustrated without deviating from the broader aspects thereof.

I claim:

1. In a decorative rectangular mirrored article comprising a generally transparent plate of substantially the same thickness throughout including the marginal portions thereof, and have a plurality of straight edges intersecting at various corners of the plate, there being a mirror-forming surface at the rear of the plate, the improvement comprising means forming within a band along each margin of the plate and visible from the front of the plate what appears to be a bevelled edge therealong, said means along said band along each margin of the plate comprising spaced, light interrupting areas behind which said mirror-forming surface extends to reflect light to the front of the plate between said light interrupting areas, said spaced light interrupting areas being so small as not to be readily individually descernible at usual viewing distances, the density of said light interrupting areas and hence the degree to which said light interrupting areas affects light reflection at the ends of said bands varying thereat so that at the confronting ends of each adjacent pair of said bands there is a relatively high density portion of said light interrupting areas of one band opposite a relatively low dense portion of the light interrupting areas of the other band along a line substantially bisecting the angle between the plate edges at the corner of the plate involved, so as to form what appears to be a mitered joint along said line at each corner of the plate.

2. The decorative mirrored article of claim 1 wherein the density of each of said bands of spaced, light interrupting areas progressively varies in a direction transversely of the margins of the plate.

3. The decorative mirrored article of claim 1 wherein said light interrupting areas are formed on the front of the plate.

4. The decorative mirrored article of claim 1 wherein said light interrupting areas are etched areas on said plate.

5. The decorative mirrored article of claim 4 wherein said etched areas of said plate are formed on the front surface of the plate.

6. The decorative mirrored article of claim 1 wherein said light interrupting areas are etched areas on said plate.

7. The decorative mirrored article of claim 1 wherein said spaced light interrupting areas are spots forming a stippled pattern.

8. The decorative mirrored article of claim 1 wherein the desnity and hence the degree of light reflection modification effected by said spaced light interrupting areas varies progressively longitudinally along substantially the full length of each of said bands thereof.

9. The decorative mirrored article of claim 1 wherein the density of said spaced light interrupting areas in each band thereof varies progressively in the same direction and for substantially the full length of each margin of the plate and so that there is a maximum density end of each band of spaced light interrupting areas adjacent a minimum end of the adjacent band of spaced light interrupting areas.

10. The decorative mirrored article of claim 9 combined with at least one additional similar mirrored article mounted in aligned abutting relation thereto, so that the relatively dense end of the bevel effect-producing means of one of the articles is opposite the least dense end of the bevel effect-producing means of the other article.

11. The decorative mirrored article of claim 9 combined with three other similar mirrored articles to form two spaced abutting pairs of aligned articles having a common meeting point, the plates being oriented relative to one another so that the most dense end of each bevel effect-producing means is opposite the least dense end of the bevel effect-producing means of the other article confronting the same, to produce a pattern of what appears to be an intersection of four mitered joints at said common meeting point.

* * * * *